US008422430B2

(12) United States Patent
Shi (10) Patent No.: US 8,422,430 B2
(45) Date of Patent: Apr. 16, 2013

(54) METHOD AND APPARATUS FOR UPDATING APN SUBSCRIPTION CONFIGURATION

(75) Inventor: Shufeng Shi, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 151 days.

(21) Appl. No.: 13/188,261

(22) Filed: Jul. 21, 2011

(65) Prior Publication Data

US 2011/0280155 A1    Nov. 17, 2011

Related U.S. Application Data

(63) Continuation of application No. PCT/CN2010/070281, filed on Jan. 20, 2010.

(30) Foreign Application Priority Data

Jan. 23, 2009    (CN) .......................... 2009 1 0001166

(51) Int. Cl.
*H04W 4/00*    (2009.01)

(52) U.S. Cl.
USPC ........................................................ 370/328

(58) Field of Classification Search ........................ None
See application file for complete search history.

(56) References Cited

U.S. PATENT DOCUMENTS

| | | | |
|---|---|---|---|
| 7,525,938 B2* | 4/2009 | Hurtta ............................. | 370/328 |
| 7,715,339 B2* | 5/2010 | Sarja et al. ..................... | 370/328 |
| 2004/0053616 A1* | 3/2004 | Overtoom et al. ............. | 455/445 |
| 2004/0209616 A1* | 10/2004 | Annic ............................. | 455/434 |
| 2006/0209768 A1 | 9/2006 | Yan et al. | |
| 2008/0125116 A1* | 5/2008 | Jiang .............................. | 455/433 |
| 2008/0273488 A1* | 11/2008 | Shaheen ........................ | 370/328 |
| 2009/0005056 A1* | 1/2009 | Gonsa et al. .................... | 455/450 |
| 2009/0010195 A1* | 1/2009 | Gonsa et al. .................... | 370/312 |
| 2009/0232022 A1* | 9/2009 | Savolainen et al. ............ | 370/254 |
| 2010/0097981 A1* | 4/2010 | Kant et al. ..................... | 370/328 |

(Continued)

FOREIGN PATENT DOCUMENTS

| CN | 1568050 A | 1/2005 |
|---|---|---|
| CN | 1798422 A | 7/2006 |

(Continued)

OTHER PUBLICATIONS

Written Opinion of the International Searching Authority dated Apr. 22, 2010 in connection with International Patent Application No. PCT/CN2010/070281.

(Continued)

*Primary Examiner* — Otis L Thompson, Jr.

(57) ABSTRACT

A method and an apparatus for updating an Access Point Name (APN) subscription configuration are disclosed. The method includes: receiving an update request message sent by a network element, where the update request message carries the first APN information, Packet Data Network (PDN) Gateway (GW) information and an International Mobile Subscriber Identity (IMSI); obtaining the second APN information of the corresponding user according to the IMSI; and updating a wild card APN subscription configuration of the corresponding user according to the first APN information if the first APN information is different from the second APN information and the corresponding user subscribes to a wild card APN. The embodiments of the present invention reduce unnecessary signaling interactions between the Home Subscriber Server (HSS) and other network elements, enhance the data transmission performance of the network, and reduce the unnecessary overhead of the HSS.

12 Claims, 6 Drawing Sheets

U.S. PATENT DOCUMENTS

| | | | | |
|---|---|---|---|---|
| 2010/0323700 | A1* | 12/2010 | Bachmann et al. | 455/436 |
| 2011/0075675 | A1* | 3/2011 | Koodli et al. | 370/401 |
| 2011/0280254 | A1* | 11/2011 | Shi | 370/401 |
| 2012/0263083 | A1* | 10/2012 | Zhou et al. | 370/310 |

FOREIGN PATENT DOCUMENTS

| | | |
|---|---|---|
| CN | 1901746 A | 1/2007 |
| CN | 101222768 A | 7/2008 |
| KR | 20040048529 A | 6/2004 |
| KR | 20040059606 A | 7/2004 |

OTHER PUBLICATIONS

Communication dated Nov. 29, 2011 in connection with European Patent Application No. 10 733 232.2.

3GPP TSG CT WG4 Meeting #42, "Change Request", Feb. 9-19, 2009, 11 pages.

3GPP TSG-SA WG2 Meeting #68, "Change Request", Oct. 13-17, 2008, 11 pages.

3GPP TS 23.003 v8.3.0, "3rd Generation Partnership Project; Technical Specification Group Core Network and Terminals; Numbering, addressing and identification (Release 8)" Dec. 2008, 69 pages.

International Search Report dated Apr. 22, 2010 in connection with International Patent Application No. PCT/CN2010/070281.

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)", 3GPP TS 29.272 v8.1.1, Jan. 2009, 57 pages.

"3rd Generation Partnership Project; Technical Specification Group Core Network and Terminals; Evolved Packet System (EPS); 3GPP EPS AAA interfaces (Release 8)", 3GPP TS 29.273 v8.0.0, Dec. 2008, 77 pages.

* cited by examiner

METHOD AND APPARATUS FOR UPDATING APN SUBSCRIPTION CONFIGURATION

CROSS-REFERENCE TO RELATED APPLICATIONS

This application is a continuation of international Application No. PCT/CN2010/070281, filed on Jan. 20, 2010, which claims priority to Chinese Patent Application No. 200910001166.4, filed on Jan. 23, 2009, both of which are hereby incorporated by reference in their entireties.

TECHNICAL FIELD

The present invention relates to communications technologies, and in particular, to a method and an apparatus for updating an Access Point Name (APN) subscription configuration.

BACKGROUND

An Evolved Packet System (EPS) may include a Mobility Management Entity (MME), which is responsible for control-plane mobility management. The MME manages user contexts and mobility states, and allocates temporary identities to users. A Home Subscriber Server (HSS) may include a home network server and/or a Home Location Register (HLR) for storing subscription information. A Packet Data Network (PDN) Gateway (GW) is a user-plane anchor between a 3rd Generation Partnership Project (3GPP) access system and a non-3GPP access system, and terminates the interface to external PDNs. The core network of the EPS is accessible to the User Equipment (UE) based on the 3GPP access technology, and to the UE based on non-3GPP access technologies such as Wireless Local Area Network (WLAN), Code Division Multiple Access (CDMA), and Worldwide Interoperability for Microwave Access (WiMAX). The UE based on non-3GPP access technologies is authenticated and authorized by a 3GPP Authentication, Authorization and Accounting (AAA) server. The AAA server receives a request from a non-3GPP UE, and obtains subscription data from the HSS. After the AAA server authenticates and authorizes the UE successfully, the UE is allowed to access the EPS network to use services.

In the EPS, the network allocates a PDN GW to an APN-oriented PDN connection initiated by the UE. The information about the PDN GW may be subscribed to statically or generated dynamically, and stored in the HSS. The PDN GW information provides a signaling and bearer switching anchor when the UE switches from the 3GPP access to the non-3GPP access subsequently, or vice versa. When the PDN GW information generated dynamically changes, the network element triggers the HSS to update the stored PDN GW information. The user of the HSS may subscribe to a wild card APN whose value is "*". The wild card APN enables the user to access any network by using a given PDN type (such as IPv4, IPv6 or IPv4-IPv6). The wild card APN is expressed as "*".

In special scenarios, for example, if the user subscribes to a wild card APN, when the UE accesses the network, the network element selects a specific APN for the user according to the APN information in the request from the UE or according to the network configuration, and allocates a specific PDN GW for the APN access to set up a PDN connection. When the network allows the UE to access multiple PDNs simultaneously (through multiple APNs) to use services, the network may select different PDN GWs according to the PDN (or APN) accessed by the UE. The APN accessed by the UE and the corresponding PDN GW information need to be stored in the HSS and used to update the corresponding information on other network elements. In the prior art, after HSS receives the relevant APN information and PDN GW information from the MME, Serving GPRS Support Node (SGSN), in which GPRS is short for General Packet Radio Service, and/or AAA server, the HSS creates an APN subscription record dynamically and updates the corresponding information on other relevant network elements synchronously according to the new APN subscription record. Meanwhile, the HSS makes a special mark to the APN subscription record to make it be different from the APN subscription record of static subscription, and the APN subscription record can be deleted conveniently after the UE is disconnected from the APN or detached from the network subsequently. After the UE is disconnected from the APN or detached from the network subsequently, the MME, SGSN and/or AAA server notifies the HSS to delete the PDN GW corresponding to the APN subscription record. The HSS deletes this APN subscription record, and deletes the APN subscription record in other network elements synchronously.

The foregoing process shows that the HSS needs to make a special mark to an APN subscription record when creating the APN subscription record so that the APN subscription record can be created and deleted between the HSS and other network elements (such as the MME, SGSN and/or AAA server) synchronously. Unnecessary interactions occur between the HSS and other network elements. For example, when the UE is disconnected from an APN, the MME and/or SGSN sends a PDN GW update message to the HSS, requesting deletion of the PDN GW information corresponding to the APN. The HSS deletes the APN subscription data according to the special mark made at the time of creating the record, and then sends a user data deletion request message to the MME/SGSN to delete the corresponding APN subscription record on the MME/SGSN, therefore adding unnecessary operations between the HSS and other network elements and reducing the data transmission performance of the network. Further, when creating the APN subscription record, the HSS needs to create not only the APN and PDN GW information, but also the information required in the ordinary APN subscription record, for example, the PDN type, and context identifier, which adds an unnecessary overhead to the HSS.

SUMMARY

The embodiments of the present invention provide a method and an apparatus for recording APN and PDN GW information to reduce the unnecessary overhead of the HSS and resolve these problems in the prior art: The HSS needs to differentiate the dynamically created APN subscription configuration from the static APN subscription configuration due to dynamic creation and deletion of the APN subscription configuration, and the signaling interaction is performed frequently as a result of synchronizing the APN subscription configuration with other network elements.

To solve such problems, an embodiment of the present invention provides a method for updating an APN subscription configuration. The method includes:

receiving an update request message sent by a network element, where the update request message carries first APN information and an International Mobile Subscriber Identity (IMSI); and obtaining second APN information of a corresponding user according to the IMSI; and updating a wild card APN subscription configuration of the corresponding user according to the first APN information if the first APN information is different from the second APN information and the corresponding user subscribes to the wild card APN.

Another embodiment of the present invention provides an apparatus for updating an APN subscription configuration. The apparatus includes:

a receiving module, configured to receive an update request message sent by a network element, where the update request message carries first APN information and an IMSI;

an obtaining module, configured to obtain second APN information of a corresponding user according to the IMSI; and an updating module, configured to update a wild card APN subscription configuration of the corresponding user according to the first APN information if the first APN information is different from the second APN information and the corresponding user subscribes to the wild card APN.

The embodiments of the present invention bring the following benefits: in the embodiments of the present invention, the HSS receives the update request message sent by the network element, and obtains the second APN information of the corresponding user according to the IMSI in the update request message. If the first APN information in the update request message is different from the second APN information and the corresponding user subscribes to the wild card APN, the HSS updates the wild card APN subscription configuration according to the first APN information. In the embodiments of the present invention, the HSS does not need to create the APN subscription configuration dynamically, the signaling interactions involved in synchronization of APN subscription configuration between the HSS and other network elements are reduced drastically, and the data transmission performance of the network is enhanced. Further, the unnecessary overhead of the HSS is reduced.

BRIEF DESCRIPTION OF THE DRAWINGS

To describe the technical solution under the present invention more clearly, the following describes the accompanying drawings involved in description of the embodiments of the present invention. Apparently, the accompanying drawings described below are illustrative and not exhaustive. Persons of ordinary skill in the art can derive other drawings from such accompanying drawings without any creative effort.

DETAILED DESCRIPTION

The following detailed description is provided with reference to the accompanying drawings to provide an understanding of the present invention. Evidently, the drawings and the detailed description are merely representative of particular embodiments of the present invention, and the embodiments are illustrative in nature and not exhaustive. All other embodiments, which can be derived by those skilled in the art from the embodiments provided herein without any creative effort, shall fall within the protection scope of the present invention.

To make the objectives, features and merits of the technical solution under the present invention clearer, the following describes the embodiments of the present invention in more detail with reference to the accompanying drawings.

Figure 1:
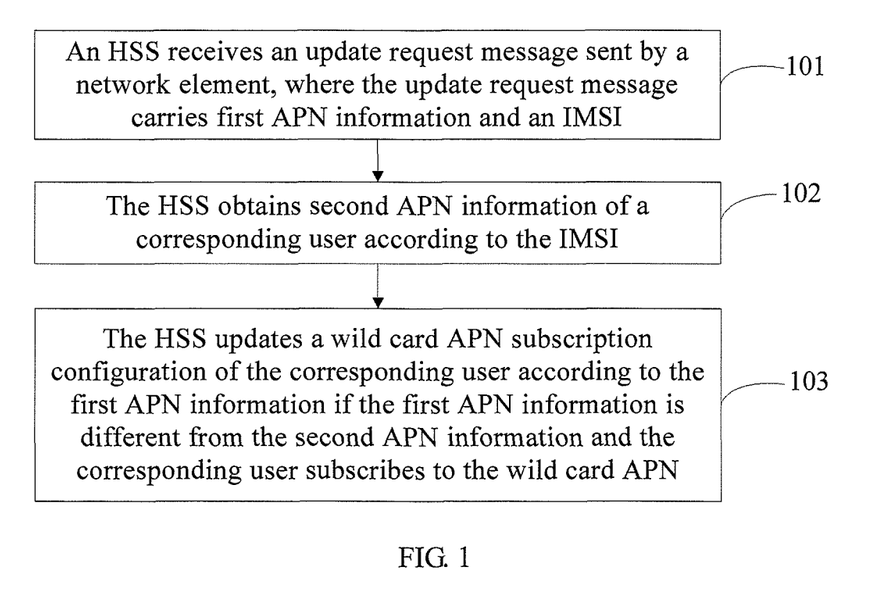
FIG. 1 is a flowchart of a method for updating an APN subscription configuration in the first embodiment of the present invention.

As shown in FIG. 1, the method provided in the first embodiment of the present invention includes the following steps:

Step 101: The HSS receives an update request message sent by a network element, where the update request message carries first APN information and an IMSI.

In practice, the HSS may be an HSS and/or an HLR; and the network element may be an MME, an SGSN, and/or an AAA server. The update request message of the MME and SGSN may be a Notify request message, and the update request message of the AAA server may be a non-3GPP IP Registration request message. The first APN information corresponds to the PDN GW to be updated. The IMSI is carried in a user name in the update request message to the HSS. It should be noted that the update request message may further carry PDN GW information. The first APN information may be a first APN name.

Step 102: The HSS obtains second APN information of a corresponding user according to the IMSI.

The HSS may obtain information about the corresponding subscriber according to the IMSI, and queries and finds the second APN information of the subscriber in the stored subscription data. The second APN information may be the second APN name.

Step 103: The HSS updates a wild card APN subscription configuration of the corresponding user according to the first APN information if the first APN information is different from the second APN information and the corresponding user subscribes to the wild card APN.

The HSS compares the first APN information with the second APN information first, and updates the wild card APN subscription configuration of the corresponding user according to the first APN information if the first APN information is different from the second APN information and the corresponding user subscribes to the wild card APN.

In the first embodiment, according to the parameter information in the update request message sent by the network element, the HSS may store or delete the first APN information and the PDN GW information by updating the wild card APN subscription configuration of the user. Directly updating the wild card APN subscription configuration makes it unnecessary to make a special mark to the first APN information, which reduces unnecessary signaling interactions between the HSS and other network elements, and enhances the data transmission performance of the network. Further, when updating the wild card APN subscription configuration, the HSS does not need to create information required in the ordinary APN subscription configuration (for example, the PDN type, and context identifier) except the APN information and PDN GW information, therefore further decreasing the unnecessary overhead of the HSS.

Figure 2:
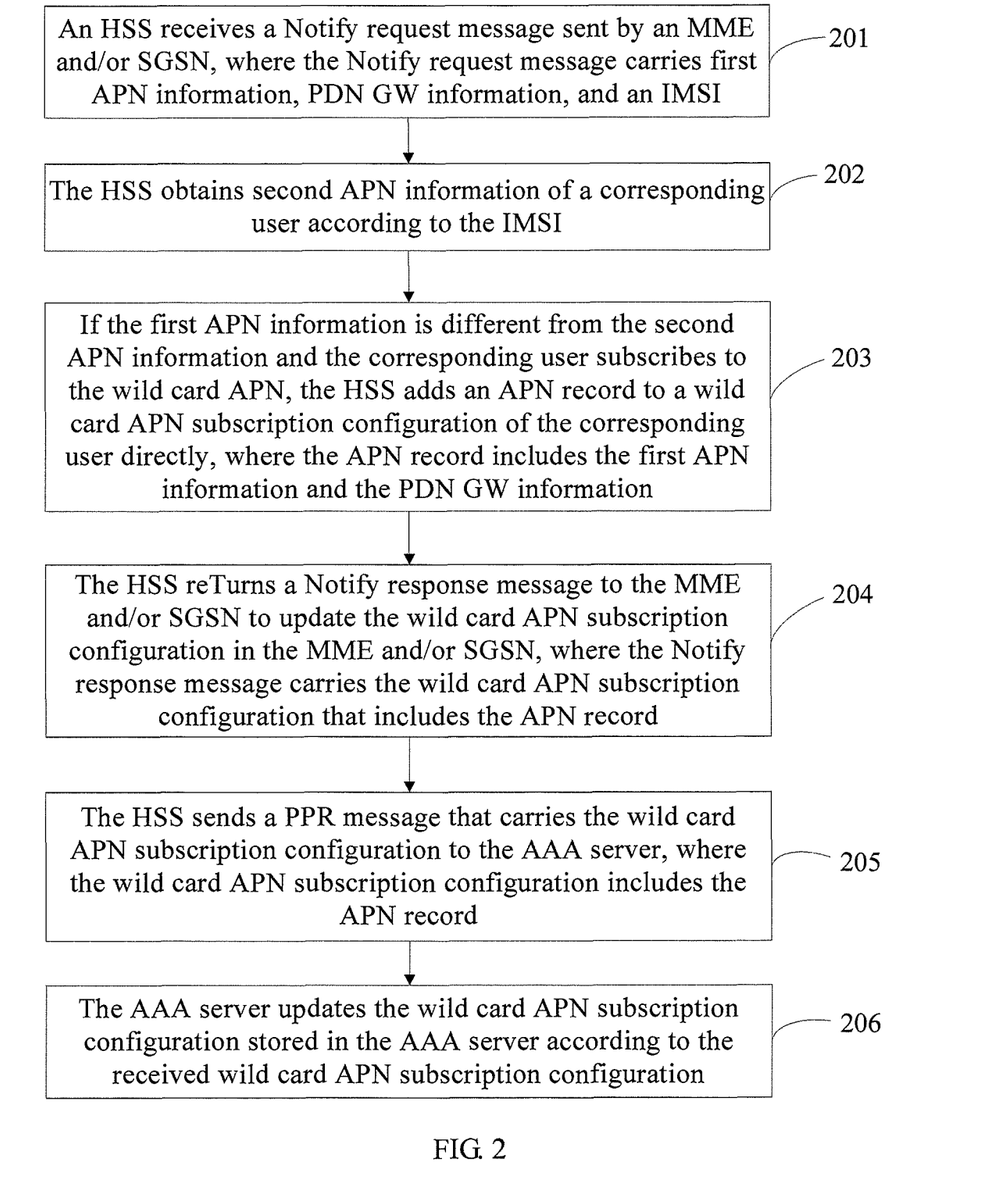
FIG. 2 is a flowchart of a method for updating an APN subscription configuration in the second embodiment of the present invention.

As shown in FIG. 2, the method provided in the second embodiment of the present invention includes the following steps:

Step 201: The HSS receives a Notify request message sent by the MME and/or SGSN. The Notify request message carries first APN information, PDN GW information, and an IMSI.

In this embodiment, the network element is an MME and/or an SGSN. Therefore, the update request message sent by the MME and/or SGSN is a Notify request message. The Notify request message in this embodiment may carry PDN GW information. Provided below is an example of a Notify request message:

| Parameter | Description |
|---|---|
| User Name | The parameter includes an IMSI of a user. |
| PDN GW Identity | The parameter tells the HSS that the network has selected a new PDN GW for the PDN connection corresponding to an APN. This parameter carries information about the new PDN GW. The parameter does not exist at the time of notifying the HSS to delete the PDN GW information corresponding to an APN. |
| APN parameter | At the time of updating or deleting the PDN GW information, the parameter exists and corresponds to the APN name involved in the update or deletion of the PDN GW. |

Figure 3:
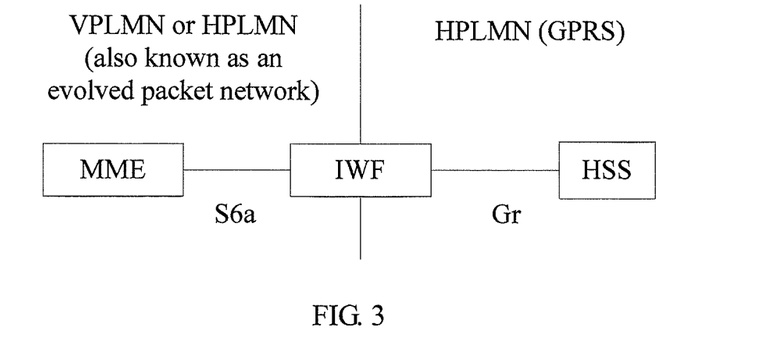
FIG. 3 shows connection relations after an Interworking Function (IWF) is added in the method for updating an APN subscription configuration in the second embodiment of the present invention.

The HSS may receive the update request message sent by the MME and/or SGSN through an IWF. In a network evolution process, the EPS network and the General Packet Radio Service (GPRS) network may coexist for a period. In the EPS network, both the S6a interface between the MME and the HSS and the S6d interface between the SGSN and the HSS are based on a Diameter protocol; in the GPRS network, the Gr/Gr+ interface from the SGSN to the HSS and/or HLR is based on a Mobile Application Part (MAP) protocol. To enable a GPRS user to roam into an EPS network without affecting the GRPS network, an IWF may be added between an HSS/HLR that supports only the Gr/Gr+ interface and an MME and/or an SGSN. The connection diagram is as shown in FIG. 3.

The IWF converts the protocol between the MAP-based Gr interface and the Diameter-based S6a interface. When a GPRS user roams into an EPS, the network element may download the subscription data of the user from the old HSS and/or HLR through the IWF, and register the location of the user and handle subsequent services. The IWF may be set between the SGSN that supports the Diameter-based S6d interface and the HSS and/or HLR to convert the protocol between the MAP-based Gr interface and the Diameter-based S6d interface.

Specifically, when receiving a Notify request message, the IWF converts the Notify request message into a MAP-based location update message, and sends the location update message to the HSS and/or HLR. The location update message may carry first APN information, PDN GW information, and an IMSI.

Step 202: The HSS obtains second APN information of a corresponding user according to the IMSI.

Step 203: If the first APN information is different from the second APN information and the corresponding user subscribes to the wild card APN, the HSS adds an APN record to a wild card APN subscription configuration of the corresponding user directly. The APN record includes the first APN information and the PDN GW information.

Specifically, the following is an example of the wild card APN subscription configuration that includes the APN record:

```
APN-Configuration: : = <AVP header: XXX XXXX>
   { Context-Identifier }
   * 2 [ Served-Party-IP-Address ]
   { PDN-Type }
   { Service-Selection }
   [ EPS-Subscribed-QoS Profile ]
   [ VPLMN-Dynamic-Address-Allowed }
   [ MIP6-Agent-Info ]
   [ PDN-GW-Allocation-Type ]
   [ 3GPP-Charging-Characteristics ]
   [ AMBR ]
   * [ Specific-APN-Info ]
   * [ AVP ]
```

In the example above, the character "*" before each Attribute Value Pair (AVP) parameter indicates that multiple such AVP parameters may exist; if the value of Service-Selection is a single "*" character, it indicates that the corresponding APN configuration is a wild card APN subscription configuration; the Specific-APN-Info includes newly added first APN information and PDN GW corresponding to the information.

The following is an example of Specific-APN-Info:

```
Specific-APN-Info: : = <AVP header: XXX XXXX>
   { Service-Selection }
   { MIP6-Agent-Info }
   { Sub-Context-Identifier }
   * { AVP }
```

In the example above, the Service-Selection includes the first APN information such as "www.cmnet.com"; the MIP6-Agent-Info includes the corresponding PDN GW information, and optionally, includes a Sub-Context-Identifier parameter, which is similar to the Context-Identifier parameter in the APN-Configuration in terms of types and functions and uniquely identifies the first APN information among all APN subscription configurations.

Step 204: The HSS returns a Notify response message to the MME and/or SGSN to update the wild card APN subscription configuration in the MME and/or SGSN server. The Notify response message carries the wild card APN subscription configuration that includes the APN record.

It should be noted that the HSS may update the wild card APN subscription configuration in the MME and/or SGSN by sending an Insert Subscriber Data Request (IDR) message that carries the wild card APN subscription configuration that includes the APN record.

Alternatively, after the network allocates a PDN GW to the APN accessed by the UE, the MME and/or SGSN sends a Notify message to the HSS, and at the same time, adds the APN and the corresponding PDN GW information to the stored wild card APN subscription configuration. In this way, the HSS does not need to update the wild card APN subscription data for the MME and/or SGSN.

If an IWF exists between the HSS and the MME and/or SGSN, the HSS may send a MAP-based location update response message to the IWF, and then the IWF converts the location update response message into a Diameter-based Notify response message and sends it to the MME and/or SGSN.

Step 205: The HSS sends a Push Profile Request (PPR) message that carries the wild card APN subscription configuration to the AAA server. The wild card APN subscription configuration includes the APN record.

It should be noted that if the HSS stores the information about the AAA server, the information about the added APN record needs to be updated to the AAA server. Specifically, the HSS sends a PPR message to the AAA server to update the APN record; the PPR message carries the wild card APN subscription configuration (APN-Configuration), and the APN-Configuration includes the added APN record. For more details, refer to the data in step 203.

Step 206: The AAA server updates the wild card APN subscription configuration stored in the AA server according to the received wild card APN subscription configuration.

In this embodiment, an IWF may exist between the HSS and the MME and/or SGSN. In this case, the method in this embodiment is also applicable to the scenario in which the EPS interworks with the HSS and/or HLR that does not support the S6a or S6d interface of Rel-8. Because the interactions between the HSS and/or HLR and other network elements are reduced, the performance of the HSS is improved.

Figure 4:
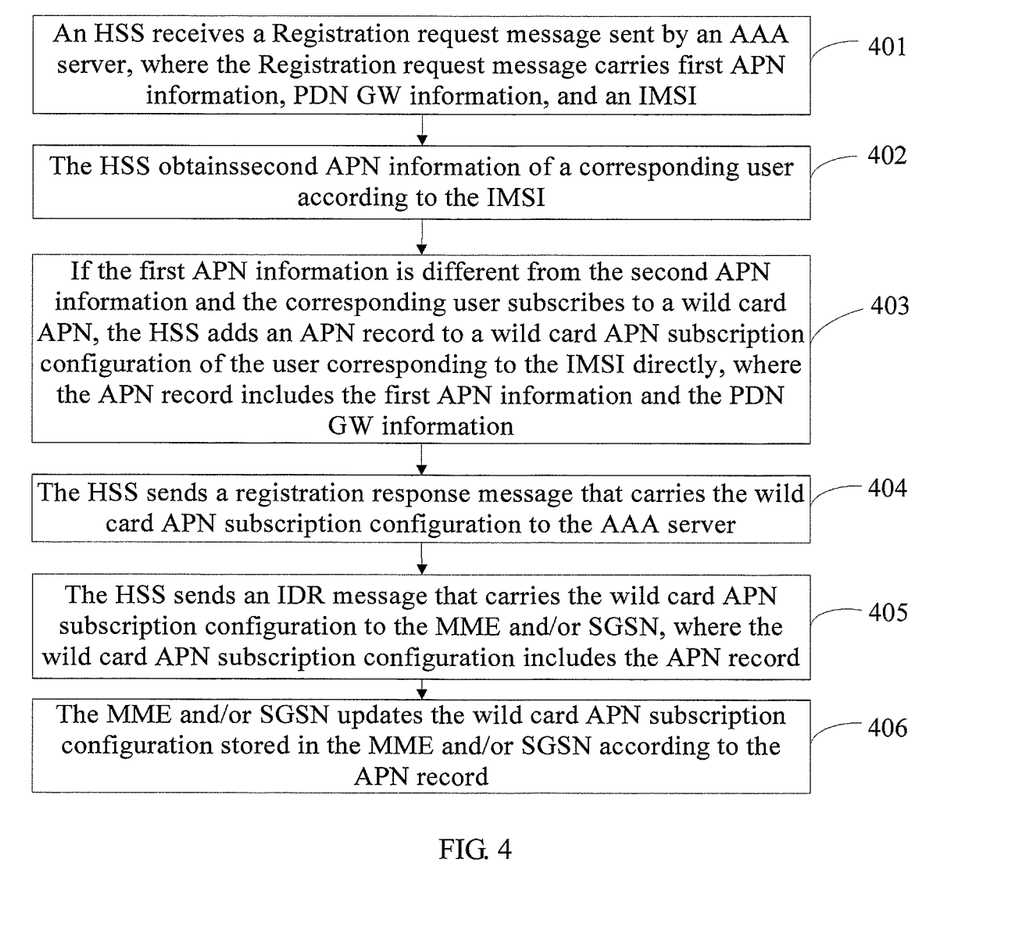
FIG. 4 is a flowchart of a method for updating an APN subscription configuration in the third embodiment of the present invention.

As shown in FIG. 4, the method provided in the third embodiment of the present invention includes the following steps:

Step 401: The HSS receives a Registration request message sent by the AAA server. The Registration request message carries first APN information, PDN GW information, and an IMSI.

In this embodiment the update request message is a Registration request message.

Step 402: The HSS obtains second APN information of a corresponding user according to the IMSI.

Step 403: If the first APN information is different from the second APN information and the corresponding user subscribes to the wild card APN, the HSS adds an APN record to a wild card APN subscription configuration of the user corresponding to the IMSI directly. The APN record includes the first APN information and the PDN GW information.

The following is an example of the wild card APN subscription configuration that includes the APN record:

```
APN-Configuration: : = <AVP header: XXX XXXX>
    { Context-Identifier }
    * 2 { Served-Party-IP-Address }
    { PDN-Type }
    { Service-Selection }
    [ EPS-Subscribed-QoS Profile ]
    [ VPLMN-Dynamic-Address-Allowed ]
    [ MIP6-Agent-Info ]
    [ PDN-GW-Allocation-Type ]
    [ 3GPP-Charging-Characteristics ]
    [ AMBR ]
    * [ Specific-APN-Info ]
    * [ AVP ]
```

In the example above, the character "*" before each AVP parameter indicates that multiple such AVP parameters may exist; if the value of Service-Selection is a single "*" character, it indicates that the data is a wild card APN subscription configuration; the Specific-APN-Info includes newly added first APN information and PDN GW corresponding to the information. The following is an example of Specific-APN-Info:

```
Specific-APN-Info: : = <AVP header: XXX XXXX>
    { Service-Selection }
    [ MIP6-Agent-Info ]
    [ Sub-Context-Identifier ]
    * [ AVP ]
```

In the example above, the Service-Selection includes the first APN information such as "www.cmnet.com"; the MIP6-Agent-Info includes the corresponding PDN GW information, and optionally, includes a Sub-Context-Identifier parameter, which is similar to the Context-Identifier parameter in the APN-Configuration in terms of types and functions and uniquely identifies the first APN information among all APN subscription configurations.

Step 404: The HSS sends a registration response message to the AAA server.

The registration response message sent by the HSS to the AAA server may carry the wild card APN subscription configuration that includes the APN record to update the wild card APN subscription configuration in the AAA server.

The HSS may also send a PPR message that carries the wild card APN subscription configuration that includes the APN record to update the wild card APN subscription configuration in the AAA server.

Alternatively, after the network allocates a PDN GW to the APN accessed by the UE, the AAA server sends a Registration request message to the HSS, and at the same time, adds the APN information and the corresponding PDN GW information to the wild card APN subscription configuration stored in the HSS. In this way, the HSS does not need to update the wild card APN subscription configuration for the AAA server separately.

Step 405: The HSS sends an IDR message that carries the wild card APN subscription configuration to the MME and/or SGSN. The wild card APN subscription configuration includes the APN record.

If the HSS stores information about the MME and/or SGSN, the HSS may send the IDR message that carries the wild card APN subscription configuration to the MME and/or SGSN, where the wild card APN subscription configuration includes the added APN record.

Step 406: The MME and/or SGSN updates the stored wild card APN subscription configuration stored in the MME and/or SGSN according to the received wild card APN subscription configuration.

In this embodiment, the HSS adds the corresponding APN record to the wild card APN subscription configuration of the subscriber directly according to the parameters in the Registration request message sent by the AAA server. If the HSS stores information about the MME and/or SGSN, the HSS sends the IDR message that carries the wild card APN subscription configuration to the MME and/or SGSN. In this way, the MME and/or SGSN can update the stored APN subscription configuration.

Figure 5:
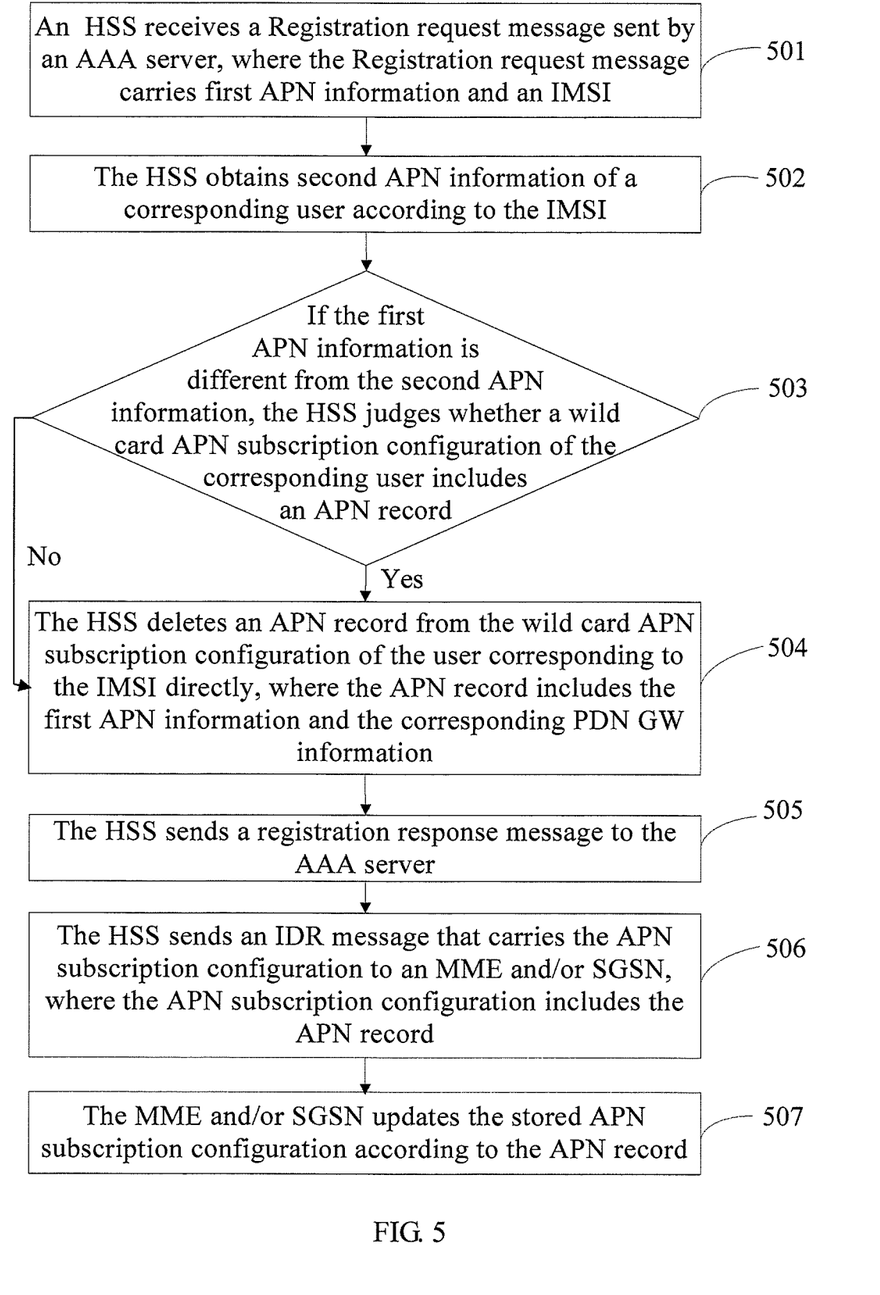
FIG. 5 is a flowchart of a method for updating an APN subscription configuration in the fourth embodiment of the present invention.

As shown in FIG. 5, the method provided in the fourth embodiment of the present invention includes the following steps:

Step 501: The HSS receives a Registration request message sent by the AAA server. The Registration request message carries first APN information and an IMSI.

Step 502: The HSS obtains second APN information of a corresponding user according to the IMSI.

Step 503: If the first APN information is different from the second APN information, the HSS judges whether a wild card APN subscription configuration of the corresponding user includes an APN record. If so, the procedure proceeds to step 504; if not, the procedure proceeds to step 505.

Step 504: The HSS deletes an APN record from the wild card APN subscription configuration of the user corresponding to the IMSI directly. The APN record includes the first APN information and the corresponding PDN GW information.

Step 505: The HSS sends a registration response message to the AAA server.

The registration response message sent by the HSS to the AAA server may carry the wild card APN subscription configuration that includes no APN record to update the wild card APN subscription configuration in the AAA server.

It should be noted that the HSS may also send a PPR message that carries the wild card APN subscription configuration that includes no APN record to update the wild card APN subscription configuration in the AAA server.

Alternatively, at the time of deleting the corresponding PDN GW after the UE is detached or the corresponding PDN connection is disconnected, the AAA server finds that the APN is stored in the wild card APN subscription configuration, and therefore, deletes the APN and the corresponding PDN GW from the stored wild card APN subscription configuration. In this way, the HSS does not need to update the wild card APN for the AAA server separately.

Step 506: The HSS sends an IDR message that carries the wild card APN subscription configuration to the MME and/or SGSN. The wild card APN subscription configuration includes no APN record.

If the HSS stores information about the MME and/or SGSN, the HSS may send an IDR message that carries the wild card APN subscription configuration to the MME and/or SGSN to update corresponding information in the MME and/or SGSN.

Step 507: The MME and/or SGSN deletes the stored APN subscription data according to the received wild card APN subscription configuration.

In this embodiment, the Registration request message includes no PDN GW information. When the HSS determines that the wild card APN subscription configuration of the corresponding user includes the APN record, it is necessary to delete the corresponding APN record according to the first APN information. The APN record includes the first APN information and the corresponding PDN GW information. The deletion information may be notified to the MME and/or SGSN through an IDR message so that the MME and/or SGSN can synchronously delete the stored data stored in the MME and/or SGSN.

It should be noted that, for ease of description in the method embodiments above, the method is described as a series of operations. It is apparent to those skilled in the art that the operations are not order-sensitive and may be performed in other order or be performed simultaneously. In addition, those skilled in the art are aware that the embodiments described herein are exemplary embodiments, and the involved operations and modules are not mandatory.

Figure 6:
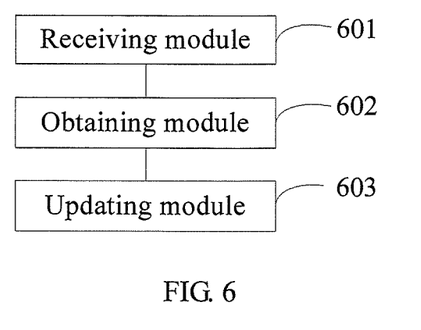
FIG. 6 shows a structure of an apparatus for updating an APN subscription configuration in the first embodiment of the present invention.

Corresponding to the method above, an apparatus for updating an APN subscription configuration is provided in an embodiment of the present invention. As shown in FIG. 6, the apparatus provided in the first embodiment of the present invention may include a receiving module 601, an obtaining module 602, and an updating module 603.

The receiving module 601 is configured to receive an update request message sent by a network element, where the update request message carries first APN information and an IMSI.

In this embodiment, the apparatus may be integrated in an HSS, or is an HSS; the update request message may further carry PDN GW information; and the first APN information may be a first APN name.

The obtaining module 602 is configured to obtain second APN information of the corresponding user according to the IMSI.

The obtaining module 602 obtains a corresponding subscriber according to the IMSI, and queries and finds the second APN information of the subscriber in the subscription data stored in the HSS. The second APN information may be a second APN name.

The updating module 603 is configured to update a wild card APN subscription configuration of the corresponding user according to the first APN information if the first APN information is different from the second APN information and the corresponding user subscribes to the wild card APN.

It should be noted that the HSS may include an HSS and/or an HLR; the receiving module 501 is further configured to receive an update request message from the network element through an IWF; the apparatus may be integrated in an HSS, or is an HSS.

In this embodiment, according to the IMSI received by the receiving module 601, the obtaining module 602 obtains the second APN information of the corresponding user; the updating module 603 updates the wild card APN subscription configuration of the corresponding user if the second APN information is different from the first APN information and the corresponding user subscribes to the wild card APN. In this embodiment, the wild card APN subscription configuration can be updated directly to avoid making a special mark to the first APN information. Thereby, unnecessary signaling interactions between the HSS and other network elements are reduced, the data transmission performance of the network is enhanced, and the unnecessary overhead of the HSS is reduced.

Figure 7:
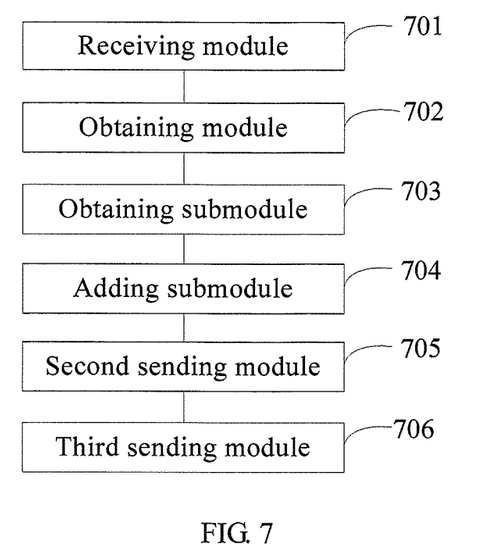
FIG. 7 shows a structure of an apparatus for updating an APN subscription configuration in the second embodiment of the present invention.

Corresponding to the second method embodiment above, a second apparatus embodiment is shown in FIG. 7. The apparatus includes a receiving module 701, an obtaining module 702, an obtaining submodule 703, an adding submodule 704, a second sending module 705, and a third sending module 706.

The receiving module 701 is configured to receive an update request message sent by the MME and/or SGSN through an IWF. The update request message carries first APN information, PDN GW information, and an IMSI.

The network element is an MME and/or an SGSN. Therefore, the update request message sent by the MME and/or SGSN is a Notify request message; and the Notify request message in this embodiment may further carry PDN GW information.

Specifically, after receiving a Notify request message, the IWF converts the Notify request message into a MAP-based location update message, and sends the location update message to the HSS and/or HLR. The location update message may carry first APN information, PDN GW information, and an IMSI.

In this embodiment, the network element is an MME and/or an SGSN; and the update request message is a Notify request message.

The obtaining module 702 is configured to obtain second APN information of a corresponding user according to the IMSI.

The obtaining submodule 703 is configured to obtain a wild card APN subscription configuration of the corresponding user.

The adding submodule 704 is configured to add an APN record to the wild card APN subscription configuration directly, where the APN record includes the first APN information and the PDN GW information.

The second sending module 705 is configured to send a PPR message that carries the wild card APN subscription configuration to the AAA server, where the wild card APN subscription configuration includes the APN record.

The third sending module 706 is configured to send a Notify response message that carries the wild card APN subscription configuration to the MME and/or SGSN.

In this embodiment, the receiving module 701 receives the update request message from the MME and/or SGSN through an IWF, and therefore, the apparatus in this embodiment is further applicable in a scenario that an IWF exists, the APN record can be created dynamically according to the message forwarded by the IWF, and the data transmission performance of the network is enhanced.

Figure 8:
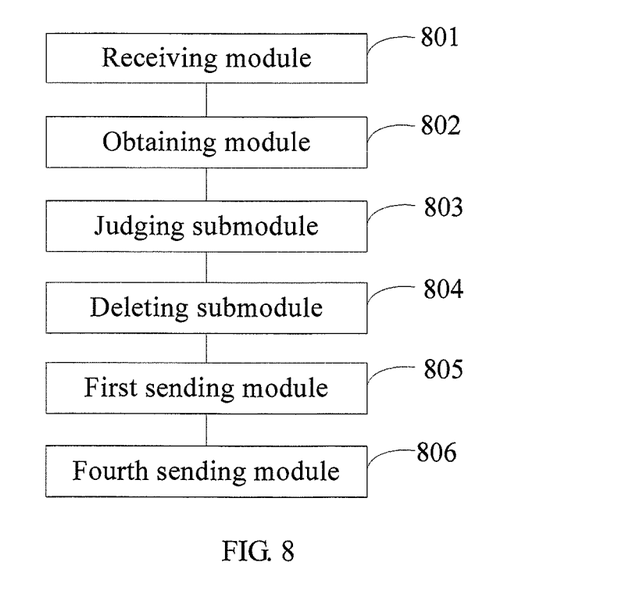
FIG. 8 shows a structure of an apparatus for updating an APN subscription configuration in the third embodiment of the present invention.

Corresponding to the fourth method embodiment above, a third apparatus embodiment is shown in FIG. 8. The apparatus may include a receiving module 801, an obtaining module 802, a judging submodule 803, a deleting submodule 804, a first sending module 805, and a fourth sending module 806.

The receiving module 801 is configured to receive a Registration request message sent by an AAA server, where the Registration request message carries first APN information and an IMSI.

In this embodiment, the network element is the AAA server, and the update request message is the Registration request message.

The obtaining module 802 is configured to obtain second APN information of a corresponding user according to the IMSI.

The judging submodule 803 is configured to judge whether a wild card APN subscription configuration of the corresponding user includes an APN record if the first APN information is different from the second APN information and the corresponding user subscribes to the wild card APN.

The deleting submodule 804 is configured to delete the APN record from the wild card APN subscription configuration directly if the judging submodule determines that the wild card APN subscription configuration includes the APN record, where the APN record includes the first APN information and the PDN GW information.

The first sending module 805 is configured to send a PPR message that carries the APN subscription configuration to the MME and/or SGSN, where the APN subscription configuration includes the APN record.

The fourth sending module 806 is configured to send a registration response message that carries the wild card APN subscription configuration to the AAA server.

In this embodiment, if the first APN information received by the receiving module 801 is different from the second APN information stored in the HSS, the new APN record may be added to the stored wild card APN subscription configuration of the corresponding subscriber dynamically, and the subscription configuration may be sent to other network elements to update the information stored in other network elements. In this way, the performance of the HSS is enhanced and the unnecessary overhead of the HSS is reduced.

Figure 9:
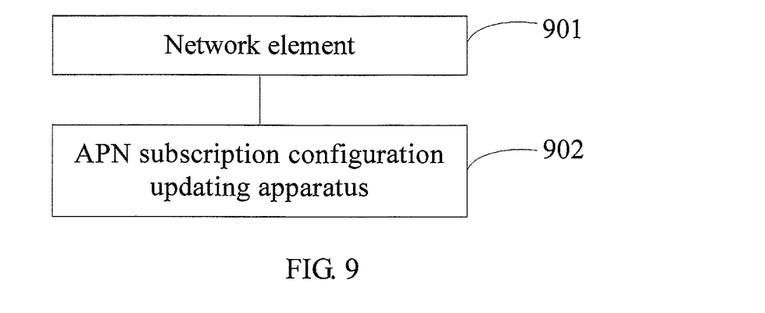
FIG. 9 shows a structure of a system for updating an APN subscription configuration in an embodiment of the present invention.

Corresponding to the method embodiment and the apparatus embodiment above, a system for updating an APN subscription configuration is provided in an embodiment of the present invention. As shown in FIG. 9, the system may include:

a network element 901, configured to send an update request message to an APN subscription configuration updating apparatus, where the update request message carries the first APN parameter, PDN GW information, and an IMSI;

an APN subscription configuration updating apparatus 902, configured to obtain second APN information of a corresponding user according to the IMSI, and update a wild card APN subscription configuration of the corresponding user according to the first APN information if the first APN information is different from the second APN information and the corresponding user subscribes to the wild card APN.

The APN subscription configuration updating apparatus 902 may include:

a receiving module, configured to receive an update request message sent by a network element, where the update request message carries first APN information and an IMSI;

an obtaining module, configured to obtain second APN information of a corresponding user according to the IMSI; and an updating module, configured to update a wild card APN subscription configuration of the corresponding user according to the first APN information if the first APN information is different from the second APN information and the corresponding user subscribes to the wild card APN.

Because the method and apparatus for updating the APN subscription configuration are detailed above and the same principles are applicable to the system for updating the APN subscription configuration, the system for updating the APN subscription configuration is not further described.

In the description herein, the terms like "first" and "second" are used to differentiate one entity or operation from another, but do not mean that the entities or operations are arranged in any practical relation or order. Moreover, the terms "include", "comprise" and any variation thereof refer to "including but not limited to". Therefore, in the context of a process, method, object or device that includes a series of elements, the process, method, object or device not only includes such elements, but also includes other elements not specified herein, and may include inherent elements of the process, method, object or device. Unless otherwise specified, in the context of "include" or "comprise", the process, method, object or device that includes the specified elements may include other elements of the same nature.

Described above are a method and an apparatus for updating an APN subscription configuration under the present invention. Although the invention is described through some exemplary embodiments, the invention is not limited such embodiments. It is apparent that those skilled in the art can make modifications and variations to the invention without departing from the spirit and scope of the invention. The invention is intended to cover the modifications and variations provided that they fall within the scope of protection defined by the following claims or their equivalents.

What is claimed is:

1. A method for updating an Access Point Name (APN) subscription configuration, the method comprising:

receiving an update request message sent by a network element, wherein the update request message carries first APN information and an International Mobile Subscriber Identity (IMSI);

obtaining second APN information of a corresponding user according to the IMSI; and updating a wild card APN subscription configuration of the corresponding user according to the first APN information if the first APN information is different from the second APN information and the corresponding user subscribes to a wild card APN.

2. The method according to claim 1, wherein:
the update request message further carries Packet Data Network (PDN) Gateway (GW) information, and
the updating the wild card APN subscription configuration of the corresponding user comprises:
adding an APN record to the wild card APN subscription configuration of the corresponding user, wherein the APN record comprises the first APN information and the PDN GW information.

3. The method according to claim 1, wherein the updating the wild card APN subscription configuration of the corresponding user comprises:
judging whether the wild card APN subscription configuration of the corresponding user comprises an APN record, wherein the APN record comprises the first APN information and Packet Data Network (PDN) Gateway (GW) information corresponding to the first APN; and
if the wild card APN subscription configuration of the corresponding user comprises the APN record, deleting the APN record from the wild card APN subscription configuration.

4. The method according to claim 1, wherein:
the network element is a Mobility Management Entity (MME) and/or a Serving General Packet Radio Service Support Node (SGSN), and after the updating the wild card APN subscription configuration of the corresponding user according to the first APN information, the method further comprises:
sending a Push Profile Request (PPR) message that carries the wild card APN subscription configuration to an Authentication, Authorization and Accounting (AAA) server, wherein the APN subscription configuration comprises the first APN information and Packet Data Network (PDN) Gateway (GW) information.

5. The method according to claim 1, wherein:
the network element is an Authentication, Authorization and Accounting (AAA) server, and after the updating the wild card APN subscription configuration of the corresponding user according to the first APN information, the method further comprises:
sending an Insert Subscriber Data Request (IDR) message that carries the wild card APN subscription configuration to a Mobility Management Entity (MME) and/or a Serving General Packet Radio Service Support Node (SGSN), wherein the APN subscription configuration comprises the first APN information and Packet Data Network (PDN) Gateway (GW) information.

6. The method according to claim 1, wherein the receiving the update request message from the network element comprises:
receiving the update request message from the network element through an Interworking Function (IWF).

7. An apparatus for updating an Access Point Name (APN) subscription configuration, the apparatus comprising:
a receiving module, configured to receive an update request message sent by a network element, wherein the update request message carries first APN information and an International Mobile Subscriber Identity (IMSI);
an obtaining module, configured to obtain second APN information of a corresponding user according to the IMSI; and
an updating module, configured to update a wild card APN subscription configuration of the corresponding user according to the first APN information if the first APN information is different from the second APN information and the corresponding user subscribes to a wild card APN.

8. The apparatus according to claim 7, wherein:
the receiving module is further configured to receive Packet Data Network (PDN) Gateway (GW) information, and the updating module comprises:
an obtaining submodule, configured to obtain the wild card APN subscription configuration of the corresponding user; and
an adding submodule, configured to add an APN record to the APN subscription configuration, wherein the APN record comprises the first APN information and the PDN GW information.

9. The apparatus according to claim 7, wherein the updating module comprises:
a judging submodule, configured to judge whether the wild card APN subscription configuration of the corresponding user comprises an APN record if the first APN information is different from the second APN information and the corresponding user subscribes to the wild card APN, wherein the APN record comprises the first APN information and Packet Data Network (PDN) Gateway (GW) information; and
a deleting submodule, configured to delete the APN record from the wild card APN subscription configuration if the judging submodule determines that the wild card APN subscription configuration comprises the APN record.

10. The apparatus according to claim 7, further comprising:
a first sending module, configured to send an Insert Subscriber Data Request (IDR) message that carries the APN subscription configuration to a Mobility Management Entity (MME) and/or a Serving General Packet Radio Service Support Node (SGSN), wherein the APN subscription configuration comprises the first APN information and Packet Data Network (PDN) Gateway (GW) information.

11. The apparatus according to claim 7, further comprising:
a second sending module, configured to send a Push Profile Request (PPR) message that carries the APN subscription configuration to an Authentication, Authorization and Accounting (AAA) server, wherein the APN subscription configuration comprises the first APN information and Packet Data Network (PDN) Gateway (GW) information.

12. The apparatus according to claim 7, wherein:
the receiving module is configured to receive the update request message from the network element through an Interworking Function (IWF).

* * * * *